Patented Nov. 21, 1944

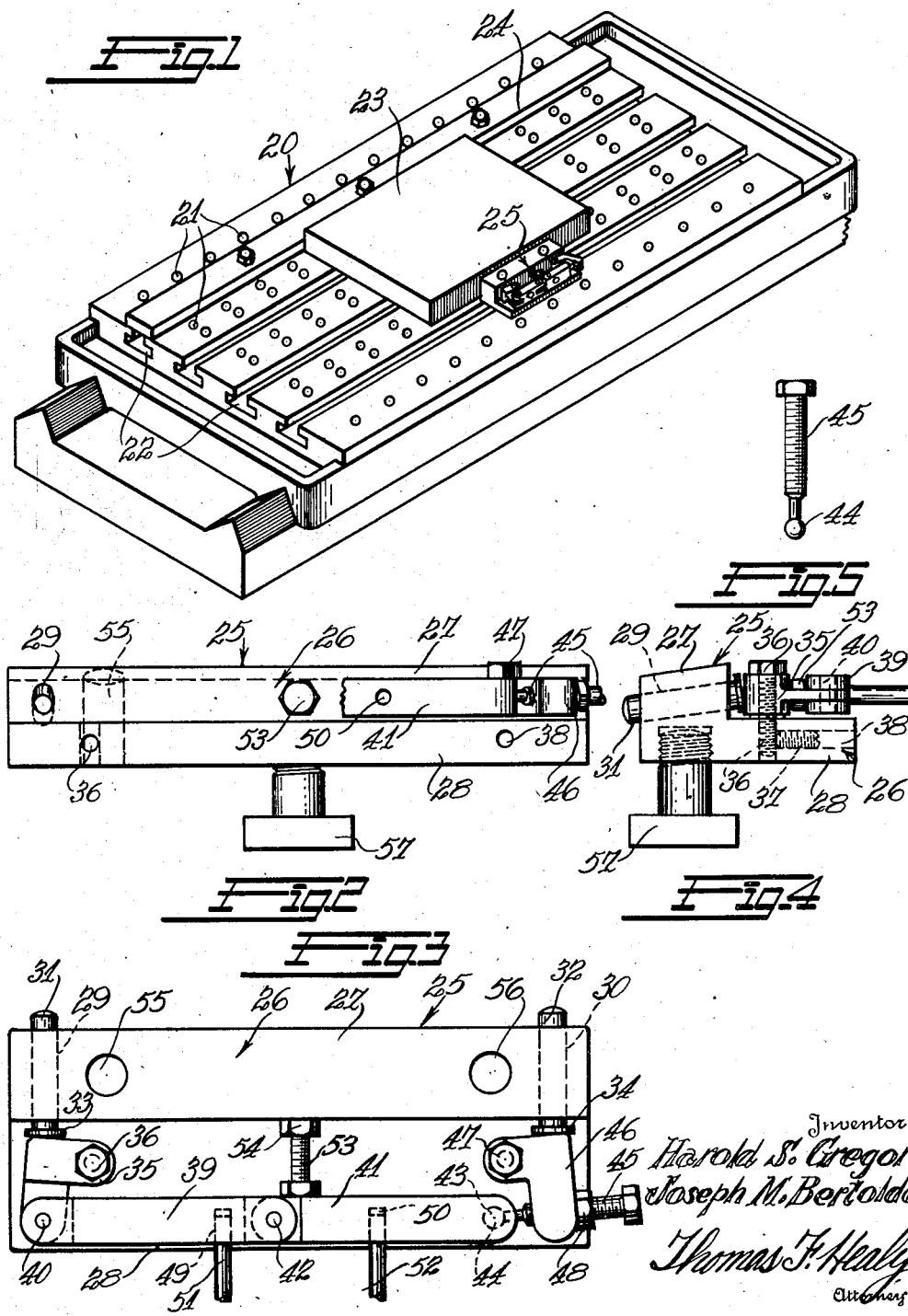

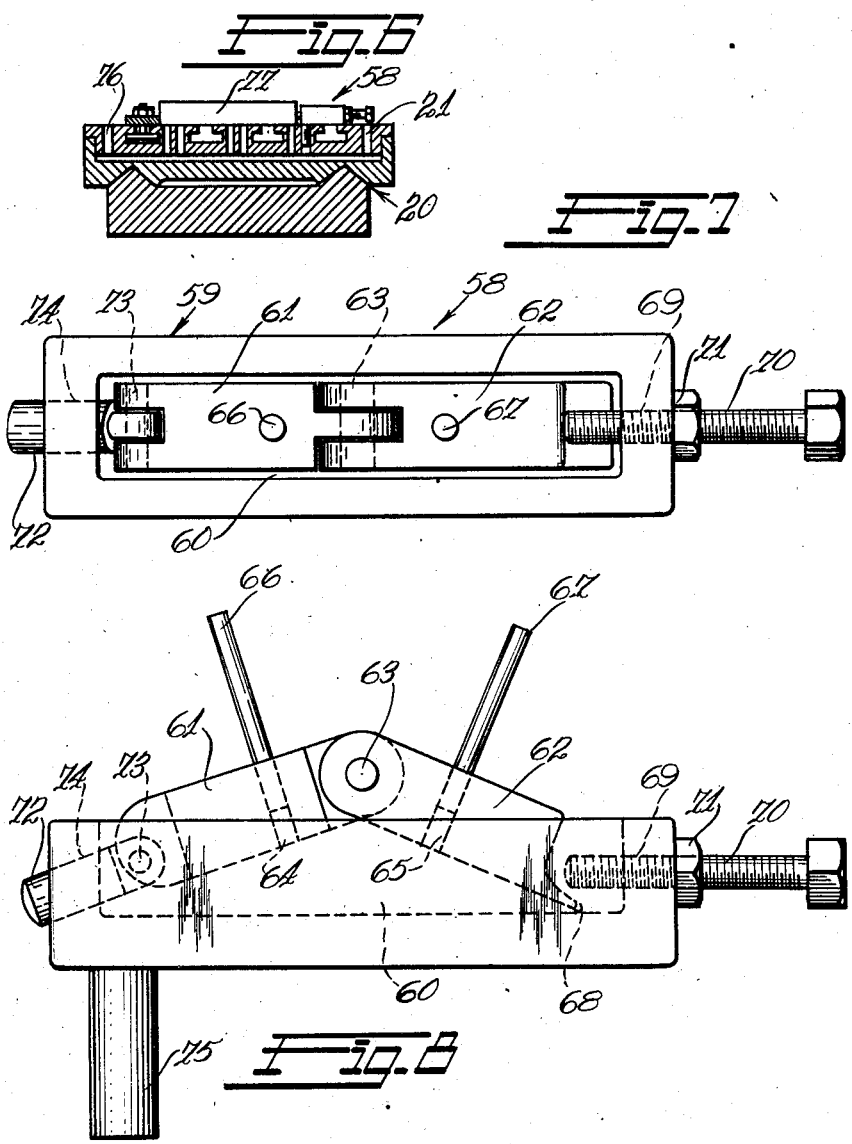

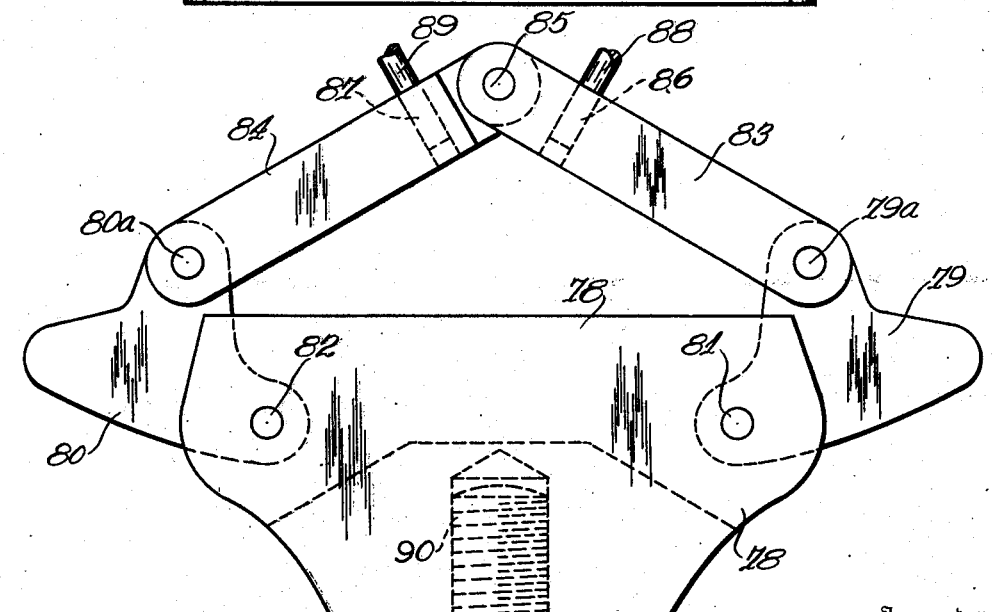

2,363,383

UNITED STATES PATENT OFFICE 2,363,383

WORK-HOLDING CLAMP

Joseph M. Bertoldo, Malden, and Harold S. Gregor, Somerville, Mass.

Application July 24, 1942, Serial No. 452,220

10 Claims. (Cl. 90—59)

The present invention relates to clamping means adapted to lock work into place, and more particularly to a work-holding clamp for use on planers, shapers and other machines having beds provided with holes and/or T slots.

The primary object of the invention is to provide a work-holding clamp which permits the material to be worked to be quickly and effectively locked into position and quickly disengaged from said locked position.

Another object is to provide an easily adjustable work-holding clamp which can be set for any one piece of material to be machined so as to maintain proper pressure thereon and, thereby to permit the progressive machining of a plurality of pieces having the same thickness, without the necessity of setting the clamp with each new piece of material.

The invention broadly embraces the concept of clamping work to place for proper machining and releasing the work from its clamped position after it has been machined. More particularly the invention embraces the provision of a speed work-holding clamp for quickly locking and unlocking work substantially to increase the speed with which work can be handled.

Other and further objects and advantages of the invention will be apparent from the following description thereof and from the claims appended thereto.

In the drawings, wherein like numerals refer to like or corresponding parts throughout the several views, Figure 1 is a perspective view of the bed of a planer, shaper or the like, provided with holes and/or T-slots, showing the work-holding clamp and the work in locked position;

Fig. 2 is a front elevation of the work-holding clamp with parts broken away;

Fig. 3 is a top plan view of the clamp;

Fig. 4 is a side elevation of the clamp;

Fig. 5 is a detail of the threaded pin, best shown in combination in Fig. 3;

Fig. 6 is a sectional view of the bed of a planer, shaper or the like, provided with holes and T-slots showing a modified form of the work-holding clamp of the invention;

Fig. 7 is a top plan view of the clamp;

Fig. 8 is a side elevation of the clamp;

Fig. 9 is a sectional view of the bed of a planer, shaper or the like, provided with holes and T-slots showing a further modified form of the work-holding clamp of the invention;

Fig. 10 is a top plan view of the clamp; and

Fig. 11 is a front elevation of the clamp.

Referring to the drawings and more particularly to Figures 1 through 5 thereof, the numeral 20 generally indicates a bed of a planer, shaper or the like, provided with a plurality of holes such as 21, and a plurality of T-slots such as 22. The work 23 is locked against the portion 24 by means of the clamp generally indicated as 25. The work 23 may be wood, metal or the like, and although only one clamp is shown, it is contemplated that a plurality of clamps may be employed to lock a piece of work into working position, the number of clamps depending upon the size and shape of the work.

The work-holding clamp 25 comprises a body portion, generally indicated as 26, of rectangular shape and being provided with a raised section 27 and a reduced section 28 which, together form an L-shaped portion. The body 26 may be composed of any suitable material, preferably metal. The section 27 is provided with two spaced apart apertures 29 and 30 in which are disposed cylindrical plungers 31 and 32, respectively. The apertures 29 and 30 preferably slant downwardly at an angle from the horizontal so that the plungers 31 and 32 exert downward pressure on the work 23 as well as horizontal pressure and so prevent the work from moving upward under pressure. The plungers 31 and 32 are free to slide longitudinally in the apertures 29 and 30, respectively, but outward movement is limited by the annular flanges 33 and 34 disposed on the inner ends thereof. The plungers 31 and 32 may be of any suitable length.

A bell crank piece 35 is pivotally supported on and secured to the section 28, as by threaded pin 36 which is locked against rotation by means of threaded pin 37 which engages in the threaded recess 38 disposed in the body section 28. The bell crank 35 is pivotally secured to toggle link 39 at the pivot pin 40. The link 39 is pivotally secured to a companion toggle link 41 at the pivot pin 42. The toggle link 41 is provided with a socket 43 at its other end, into which fits a ball 44 to form a ball and socket joint. The ball 44 is disposed on the end of a threaded pin 45 which engages through an internally threaded aperture in the bell crank 46, which is pivoted at 47 as is bell crank 35 to provide the conventional bell crank movement in the assembly.

Pin 45 is provided with a lock nut 48. Pressure on the toggle links can be selectively increased or decreased by manipulating pin 45.

Apertures 49 and 50 are disposed in the toggle links 39 and 41, respectively. Rods 51 and 52 removably engage said recesses 49 and 50. The rods 51 and 52 are employed to snap the clamp open or shut and are ordinarily six or eight inches long or any length sufficient to obtain the necessary leverage to quickly open or shut the clamp. The rods are disengaged from the recesses by pulling in an axial direction.

The body section 27 carries a detent which comprises a screw 53 and a lock nut 54. The detent is adjustable and is adapted to limit the movement of the toggle links 39 and 41. The body section 27 has two vertically disposed holes 55 and 56 which are adapted to receive pins for engagement in holes 21 of the bed 20.

A T-bolt 57 threadedly engages the underside of body section 27 midway between the apertures 29 and 30. The effective shank of the bolt 57 can be selectively increased or decreased by rotation of the said bolt. The T-bolt 57 is adapted to slide in the T-slots 22 to bring the clamp 25 into operative position relative to work 23.

In the operation of locking the work in position pressure is exerted on rods 51 and 52 and the plungers 31 and 32 are thrust forward against the work 23. The pressure on the rods is transmitted to the plungers through the toggle links 39 and 41 and the bell cranks 35 and 46.

Referring now to Figs. 6, 7 and 8, the numeral 58 generally indicates a modified form of the work-holding clamp of this invention and comprises a body portion generally indicated as 59. The body portion 59 is rectangular in shape and is provided with a recessed portion 60 in which is disposed toggle links 61 and 62 which are pivotally secured at the pivot pin 63.

Links 61 and 62 are each recessed, as at 64 and 65, and rods 66 and 67 are adapted to removably engage therein. The link 62 is provided with a second pivot point 68 which engages the floor of the recess 60. One side wall of the body portion 59 is provided with an internally threaded aperture 69 intermediate the ends thereof. A threaded pin 70 engages through said aperture 69 and extends into recess 60. A lock nut 71 is disposed on pin 70. Pin 70 can be laterally adjusted to increase or decrease effective pressure on the links 61 and 62 when said links are in the same horizontal plane, i. e., when the clamp is closed or in work-engaging position.

The toggle link 61 has a plunger 72 pivotally secured at the other end thereof as by pivot pin 73. The plunger 72 is disposed for sliding engagement in an aperture 74 in the other side wall of the body 59. The aperture 74 extends downwardly at an angle from the horizontal to effect a downward pressure on the work when the clamp is in work engaging position.

A pin 75 is threadedly secured in the under portion of the body 59 and is adapted for snug engagement in the holes in the bed of the planer or shaper, such as 76. The pin 75 is preferably carried by the body at a point near the aperture 74 and may be T-shaped, if desired, for engagement in the T-slots of the bed.

In operation the clamp is positioned on the bed adjacent the working material 77 with the pin 75 being disposed in a suitable hole 76. Pressure is exerted on rods 66 and 67 and the plunger 72 is thrust against the work to lock the same in place. Movement is transmitted to the plunger 72 through the link 61. When the clamp is in locked position, the rods 66 and 67 are removed from recesses 64 and 65.

The lock can be released by reinserting the rods 66 and 67 and with leverage action snapping the toggle links 61 and 62 upwardly thereby to release pressure on plunger 72. The threaded pin 70 is employed to increase pressure on links 61 and 62 to make it more difficult to snap the lock open and to insure an effective lock.

Referring now to Figs. 9, 10 and 11, we show a further modified form of the work-holding clamp of this invention comprising a body portion 78 of substantially semi-elliptical shape. The body 78 is recessed at the upper portion thereof to receive bell crank pieces 79 and 80 which are pivotally supported in the front and rear walls of the body 78 as by pivot pins 81 and 82.

The bell cranks 79 and 80 are also pivotally secured to toggle links 83 and 84, respectively, as at pivot pins 79a and 80a. The links 83 and 84 are pivotally secured to each other at their other ends as at pivot pin 85. The links 83 and 84 are each provided with recesses 86 and 87, preferably disposed substantially adjacent the pivot pin 85. Lever rods 88 and 89 removably engage in said recesses.

The body 78 is provided with an internally threaded aperture 90 in the under portion thereof. A threaded T-bolt 91 engages in said recess 90 and its effective length may be adjusted by rotation thereof. The bolt 91 is provided with a lock nut 92.

In operation the clamp is positioned on the bed by engaging the T-bolt 91 into T-slot 93. The bell crank pieces 79 and 80, or both as the case may be, are loosely positioned over the work 94. The effective length of the shank of T-bolt 91 can be initially adjusted depending upon the thickness of the material being worked. With this major adjustment accomplished, pressure is now exerted on rods 88 and 89 and the bell cranks 79 and 80 clamp the work in position.

Movement is transmitted to the bell crank pieces through toggle links 83 and 84. The rods 88 and 89 can then be removed from the recesses 86 and 87.

It is contemplated that a plurality of similar clamps may be employed where desired, or a plurality of different clamps. The clamps may vary in size depending upon their use. The clamps are designed to speed up the operation of locking up work in various machines and particularly in machines having holes or slots in the beds thereof. Duplicate work can be readily and speedily handled by these snap clamps once they have been properly set.

Various modifications of this invention will be apparent to those skilled in the art without departing from the spirit of this invention and we desire to be limited only by the scope of the appended claims.

Having thus described the invention, what is claimed as new is:

1. A work-holding clamp for use on machines having beds provided with holes or T-slots, comprising a body portion provided with spaced-apart apertures, a plunger disposed in each of said apertures and adapted for movement therein, a rod carried by said body portion and adapted for engagement in said holes or T-slots, a pair of bell crank pieces pivotally carried by said body portion in spaced relation, one of said bell crank pieces being provided with a threaded aperture therethrough, each of said bell crank pieces adapted to contact one of said plungers, a pair of toggle links, one of said links having one end portion thereof secured to one of said bell crank pieces and its other end portion pivotally secured to an end portion of the other of said toggle links, said second-mentioned toggle link being provided with a socket at its other end portion, a threaded rod provided with a ball portion threadedly engaging through said threaded aperture of said other bell crank piece, said ball portion engaging into said socket to form a ball and socket joint, each of said toggle links being recessed near their point of pivotal contact with each other, rods adapted to fit into said recesses and adapted to operate said plungers through said bell crank pieces and links and adjustable detent means carried by said body portion to limit the movement of said toggle links.

2. A work-holding clamp comprising a recessed body portion provided with oppositely disposed apertures in the side walls thereof, two toggle links pivotally supported by said body portion and pivotally secured to each other, each of said links being provided with a recessed portion, two rods each adapted for removably engaging in each of said recesses, a plunger pivotally secured to one of said links and extending through one of the apertures in the side walls of the body, a pin engaging through the oppositely disposed aperture in the other side wall of the body and adapted to engage the other of said links.

3. A work-holding clamp for use on machines having beds provided with holes, comprising a recessed body portion provided with oppositely disposed apertures in the side walls thereof, two toggle links pivotally supported in said body portion and pivotally secured to each other, each of said links being provided with a recessed portion, two rods each adapted for removably engaging in each of said recesses, a plunger pivotally secured to one of said links and extending through one of the apertures in the side walls of the body, a pin engaging through the oppositely disposed aperture in the other side wall of the body and adapted to engage the other of said links, and a pin carried by said body adapted for engagement in the holes in the bed of the machine.

4. A work-holding clamp comprising a recessed body portion, two spaced bell crank pieces pivotally supported by said body portion, two toggle links pivotally secured to each other and each having its other end pivotally secured to one of said bell crank pieces and each of said toggle links being recessed and each adapted to removably receive a rod.

5. A work-holding clamp for use on machines having beds provided with T-slots, comprising a recessed body portion, two spaced bell crank pieces pivotally supported by said body portion, two toggle links pivotally secured to each other and each having its other end pivotally secured to one of said bell crank pieces, each of said toggle links being recessed and each adapted to removably receive a rod, and a T-bolt carried by said body and adapted for engagement in said T-slot.

6. A work-holding clamp comprising, a body portion, a work engaging portion, toggle means adapted to operate said work engaging portion, adjustable means engaging said toggle means and adapted for selectively controlling pressure exerted on said toggle means to adjust the ease of movement thereof, said toggle means being provided with spaced recessed portions, and rods for removable engagement in said recesses, whereby the work engaging portion can be moved into work engaging position through said toggle means by pressure on said rods.

7. A work-holding clamp for use on machines having beds provided with holes or T-slots, comprising a body portion provided with spaced-apart apertures, a plunger disposed in each of said apertures and adapted for movement therein, a rod carried by said body portion and adapted for engagement in said holes or T-slots, toggle means carried by said body portion and adapted to simultaneously operate said plungers, adjustable means engaging said toggle means and adapted for selectively controlling pressure exerted on said toggle means to adjust the ease of movement thereof, said toggle means being provided spaced recess portions, rods for speedy removable engagement in said recesses, and adjustable detent means carried by said body portion to limit the movement of said toggle means.

8. A work-holding clamp for use on machines having beds provided with holes or T-slots, comprising a body portion provided with spaced-apart apertures, a plunger disposed in each of said apertures and adapted for reciprocatory movement therein, guard means carried by each of said plungers to permit withdrawal of each plunger in only one direction from each of said apertures, a rod carried by said body portion and adapted for engagement in said holes or T-slots, toggle means carried by said body portion and adapted to simultaneously operate said plungers, adjustable means engaging said toggle means and adapted for selectively controlling pressure exerted on said toggle means to adjust the ease of movement thereof, said toggle means being provided with spaced recess portions, rods for speedy removable engagement in said recesses, and adjustable detent means carried by said body portion to limit the movement of said toggle means.

9. A work-holding clamp comprising a body portion, a work engaging portion, toggle means comprising a plurality of links each pivotally secured to an adjoining link and adapted to operate said work engaging portion, two adjoining links of said toggle means each being provided with recess intermediate the ends thereof, and rods for removable engagement in said recesses, whereby the work engaging portion can be moved into work engaging position through said toggle means by pressure on said rods.

10. A work-holding clamp for use on machines having beds provided with holes or T-slots, comprising a body portion carrying a rod adapted for engagement in said holes or T-slots, a work engaging portion, toggle means comprising a plurality of links each pivotally secured to an adjoining link and adapted to operate said work engaging portion, two adjoining links of said toggle means each being provided with a recess intermediate the ends thereof, and rods for removable engagement in said recesses, whereby the work engaging portion can be moved into work engaging position through said toggle means by pressure on said rods.

JOSEPH M. BERTOLDO.
HAROLD S. GREGOR.